(No Model.)
C. D. ELDER.
CREAM TRANSPORTATION TANK.
No. 285,348. Patented Sept. 18, 1883.
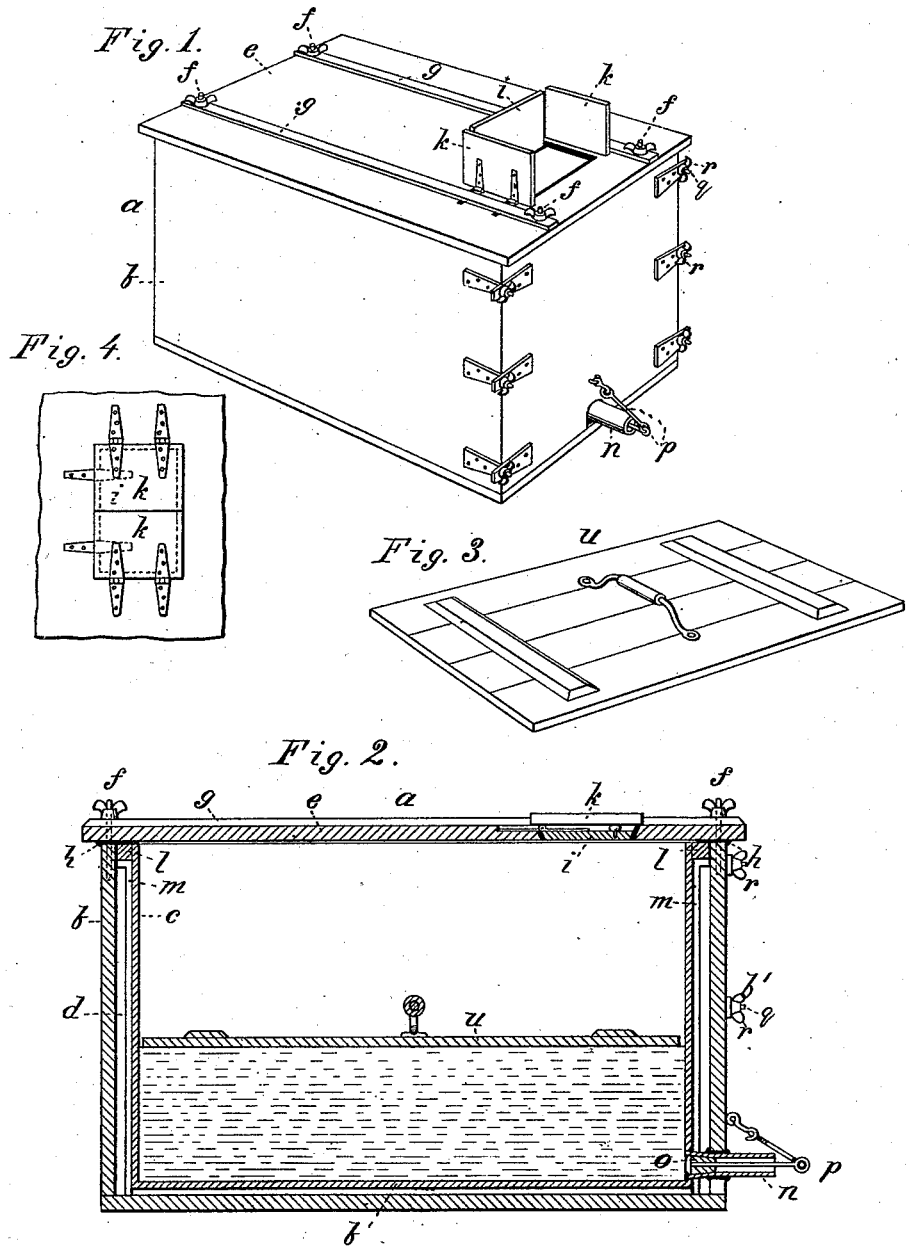

UNITED STATES PATENT OFFICE.

CORNELIUS D. ELDER, OF OSAGE, IOWA.

CREAM-TRANSPORTATION TANK.

SPECIFICATION forming part of Letters Patent No. 285,348, dated September 18, 1883.

Application filed July 25, 1883. (No model.)

*To all whom it may concern:*

Be it known that I, C. D. ELDER, a citizen of the United States, residing at Osage, in the county of Mitchell and State of Iowa, have invented certain new and useful Improvements in Cream-Transportation Tanks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and shows a perspective view. Fig. 2 is a longitudinal section. Fig. 3 is a perspective view of the float. Fig. 4 is a detail showing a top view of the wings, with the door beneath.

This invention has relation to cream-transportation tanks; and it consists in the construction and novel arrangement of parts, as will be hereinafter fully described, and particularly pointed out in the claims appended.

The objections to the cans and fixtures heretofore used in the transportation of cream, among others, are that the cream freezes in winter, and becomes too hot in summer and sours and turns bitter. The tin float commonly used is provided with a hole, and this causes the float to churn the cream, causing a great loss to the creamery business.

The objects of my invention are to surmount these difficulties by producing a transportation-tank for cream that will not permit it to freeze in winter, become too hot in summer, or be churned by the float used with the tank.

Referring by letter to the accompanying drawings, $a$ designates a rectangular-shaped tank, the outer casing, $b$, of which is of wood, and the inner wall or lining, $c$, is of metal, a dead-air space, $d$, being provided between the casing and the lining to render the walls non-conductive of heat and cold, to that degree, at least, that will prevent the cream in the tank from freezing in winter or becoming too hot in summer.

The entire top or cover $e$ of the tank is made removable, and is fastened to the tank-body by four bolts and nuts, $f$, two at each end of the tank-body, and two binding strips or sticks, $g$ $g$, which extend over the cover from end to end of the same. The cover and strips are slotted to receive the bolts. A rubber packing, $h$, is interposed between the cover and tank-body, and the nuts turned down to secure the cover in place, thereby rendering the joint between the cover and tank-body air-tight, so that should the filled tank be upset no cream would be spilled. There is a door, $i$, in the cover, through which the cream is poured as it is gathered. The door $i$ is also provided with a rubber packing, which renders it air and water tight, so that there is no danger of leakage at this point.

In order to prevent the cream from being blown by the wind and wasted as it is being poured into the tank, I provide two wings, $k$ $k$, hinged one at each end of the door $i$, so as to fold down inwardly upon the door when closed, but which may be turned up vertically when the door is to be opened, and, together with the door, to form guards on three sides of the door when open.

The lining $c$ is secured to a strong frame, $l$, of suitable material, at its upper edge, and stays $m$ extend from the frame $l$ to the bottom of the casing $b$, between the lining and the casing, to prevent the lining from being bent or jammed by rough usage. These stays may be secured within the said space by any well-known means. $n$ designates the draw-off pipe, which is of iron or heavy tin, and it is provided with a stopper or cork, $o$, on the inside of the tank, which is worked by a rod, $p$, passing through the pipe, by which the stopper may be pushed out to open or pulled in to close the pipe. The rod $p$ is jointed, so that it may be turned over the end of the pipe and fastened to the tank when the pipe is closed, so that there is no danger of the rod becoming loose unless desired. The cork is weighted to prevent it from floating when pushed out of the pipe.

A stop-cock may be used; but I prefer the cork and jointed rod with the pipe, as it is more easily cleaned.

The end of the casing $b'$ carrying the pipe is made removable by means of the bolts and nuts $q$ $r$, so that by loosening said bolts and nuts this end may be taken off and the lining $c$ may be slipped out of the casing for repairs.

The float $u$, I employ with this tank is made of wood, is light, and perfectly smooth on its under face, which rides on the cream. It is not designed to hold the cream in the tank, but is intended to steady it and prevent it from splashing or churning, although working free in the tank.

Having thus fully described my invention, what I claim as new, and desire to secure by Letters Patent, is—

1. The combination, with the door $i$ in the cover of the tank, of the wings $k\ k$, hinged at the ends of the door-space, and adapted to form, in connection with the door when open, guards on three sides of the opening, substantially as specified.

2. The combination of the casing having the drawing-off tube, and the removable end having the aperture for said tube, the removable cover, and the removable lining $c$, arranged to form a dead-air space between the lining and casing, substantially as specified.

In testimony whereof I affix my signature in presence of two witnesses.

C. D. ELDER.

Witnesses:
J. I. SWENEY,
DANIEL SHEEHAN.